United States Patent
Farago et al.

(12) 
(10) Patent No.: US 6,643,662 B1
(45) Date of Patent: Nov. 4, 2003

(54) SPLIT BI-DIRECTIONAL STACK IN A LINEAR MEMORY ARRAY

(75) Inventors: Steven Robert Farago, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 09/667,751

(22) Filed: Sep. 21, 2000

(51) Int. Cl.$^7$ ................................................ G06F 17/30
(52) U.S. Cl. ........................................ 707/101; 711/132
(58) Field of Search ................................ 707/1, 2, 3, 4, 707/5, 6, 7, 8, 100, 101, 104.1; 711/132; 712/202

(56) References Cited

U.S. PATENT DOCUMENTS 6,006,323 A * 12/1999 Ma et al. ..................... 712/202
6,138,210 A * 10/2000 Tremblay et al. ........... 711/132

OTHER PUBLICATIONS

Kaiping Li et al., "A Bidirectional multiple stack algorithm" IEEE trasactions on communications, vol, 47, No. 1, Jan. 1999.*

Korsh et al., "A Multiple Stack Manipulation Procedure," Nov. '83, pp 27–29, plus one page w/ ltr.

Knuth, "The Art of Computer Programming," 2d ed., vol. 1, pp240–248.

Garwick, "Data Storage in Compilers," Bit 4, 1964, pp 137–140.

Yeh et al., Dynamic Initial Allocation and Local Reallocation Procedures for Multiple Stacks, Communications of the ACM, Feb. '86, pp 30–39.

* cited by examiner

*Primary Examiner*—Charles Rones
*Assistant Examiner*—Yicun Wu
(74) *Attorney, Agent, or Firm*—Anthony V. S. England; Casimer K. Salys (57) ABSTRACT

In a method, system, and apparatus for managing storage of data elements, a storage area having a first and second end is provided for storing the data elements. In the storage area, a first stack of data elements has first and second ends respectively facing the first and second ends of the storage area, and a second stack has data elements located proximate both ends of the first stack. That is, the second stack is split, with the first stack interposed between data elements of the second stack. Likewise, there may be a third and fourth stack, and so on, which are split into more than one part. The stacks increase in size toward both the first end of the storage area and the second end of the storage area, responsive to the storing of successive ones of the data elements in the respective stacks. Furthermore, the increasing in size of one of the split stacks may include increasing away from the first stack, or alternatively, increasing toward the first stack.

27 Claims, 8 Drawing Sheets

SPLIT BI-DIRECTIONAL STACK IN A LINEAR MEMORY ARRAY

CROSS REFERENCE TO RELATED APPLCIATIONS

The present application is related to the following applications which are assigned to the same assignee and filed on the same date as the present application, and are hereby incorporated herein by reference:

"Bi-directional Stack in a Linear Memory Array," U.S. patent application Ser. No. 09/671,513 filed Sep. 2, 2000, now abandoned.

"Proportionally Growing Stack in a Linear Memory Array," U.S. patent application Ser. No. 09/666,275, currently allowed.

BACKGROUND OF THE INVENTION

1. Technical Field

The present invention is related generally to an improved data processing system and, more particularly, to an improved first in last out data structure within a memory array.

2. Description of Related Art

A stack or First In Last Out (FILO) data structure is used in many computer applications. Often multiple stacks are needed in a single application and they are added on an as needed basis because, at the beginning of the application, it is not known how many stacks will be needed. Since memory in computer systems is arranged as a linear array, the application will have some segment of this linear array that it will use to place multiple stacks. The way stacks are traditionally implemented is with a base and head pointer.

In a typical case, two stacks are placed at opposite ends of the memory array. One stack grows to the right and the other stack grows to the left. Each stack may grow until it hits the stack coming from the opposite direction (which is referred to as a collision).

The arrangement with two stack growing toward one another from opposite ends of the array is efficient if both the stacks grow at the same rate. That is, all memory within the memory array will be consumed before a collision. However, if a third stack is needed, a problem may arise. If all three stacks grow at the same rate, and the third stack grows in only one direction, and the third stack is placed in the middle of the first two stacks, then the third stack will tend to collide with one of the other two stacks, before the other of the other two stacks has used all its space. The third stack could be offset in location from the center in an effort to anticipate this problem, but if the three stacks do not grow at the same rate, then the selected offset location of the third stack may not help, and may even aggravate the problem.

In one of the related applications, these problems are addressed by one or more bi-directionally growing stacks. The bi-directionally growing stacks are useful for addressing problems which arise in managing the space in a linear memory array, including allocation of the space. However, a need exists for a method or apparatus to manage memory having other features, which relate to aspects of these problems in a different way, and which may provide even greater adaptability in certain circumstances.

SUMMARY OF THE INVENTION

The present invention addresses this need in a method, system, and apparatus for managing storage of data elements. A storage area, having a first and second end, is provided for storing the data elements. In the storage area, a first stack of data elements has first and second ends respectively facing the first and second ends of the storage area, and a second stack has data elements located proximate both ends of the first stack. That is, the second stack is split, with the first stack interposed between data elements of the second stack. Likewise, there may be a third and fourth stack, and so on, which are split into more than one part. The stacks increase in size toward both the first end of the storage area and the second end of the storage area, responsive to the storing of successive ones of the data elements in the respective stacks. Furthermore, the increasing in size of one of the split stacks may include increasing away from the first stack, or alternatively, increasing toward the first stack.

In still another aspect, the storage area has four mutually exclusive sections. The first section (an "end" one of the sections) has an end proximate one of the storage area ends. The second section (another "end" one of the sections) has an end proximate a second one of the storage area ends. A third section (a "middle" section) is located between the first and second sections. A fourth section (another "middle" section) is also located between the first and second sections. The first stack is confined to the two middle sections and the second stack to the two end sections.

In yet another aspect the split third stack is confined to the middle two sections.

Regarding the aspect wherein stacks, such as the second and third stack, increase in size toward both the first and second ends of the storage area, in one embodiment the second stack increases away from the first stack, and the third stack increases toward the first stack. Alternatively, the second stack increases toward the first stack, and the third stack increases away from the first stack.

As described in one of the related applications, it is an advantage of bi-directionally growing stacks that under certain conditions and within certain limitations a storage area is more efficiently used by an odd number of bi-directional stacks than by an odd number of unidirectional stacks. It is an advantage of the present invention that space in the storage area is used more efficiently, under certain conditions and within certain limitations, by having a first bi-directional stack located in a central part of the storage area, and splitting a second bi-directional stack into two parts, one on either side of the first stack.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Herein, the term "array" refers to a memory storage space (a.k.a. area) of limited size having discrete storage elements. Inherently, the storage elements of the array have respective locations with respect to one another. The term "linear array" refers to such a storage area wherein the storage element locations in the array are defined in a linear fashion. That is, the elements of the array may be thought of as being stacked up in a single file line. Accordingly, each element may be uniquely identified according to its location along the "line," and the limited size, linear array may be referred to as being bounded by a first and second end of the line, such as a "right end" and a "left end," for example. Thus, a storage element of the linear array may be referred to as being located "toward the right end" or "toward the left end" along the line with respect to another storage element. More succinctly, a storage element of the linear array may be referred to as being "to the right of" or "to the left" of another storage element of the linear array.

Also, a set of data elements stored in the array may be referred to and managed as an individual "stack" within the array, that is, a set of data elements stacked up in a single file "line." The stack may be said to "grow" as successive data elements are added to the stack. If there are no discontinuities of the data elements in a first stack, e.g., there are no data elements of a second stack interposed between any of the data elements of the first stack, then it may be said that the first stack has only a first and second end. (If a stack does have discontinuities, then the stack may have more than two ends.) Herein, a reference to a second stack having data elements located "proximate an end of," or "on an end of," a first stack does not necessarily imply that any of the second stack's data elements abut the end of the first stack, but includes an arrangement wherein some of the second stack's data elements are located between the end of the first stack and a corresponding end of the storage area.

Figure 1A:
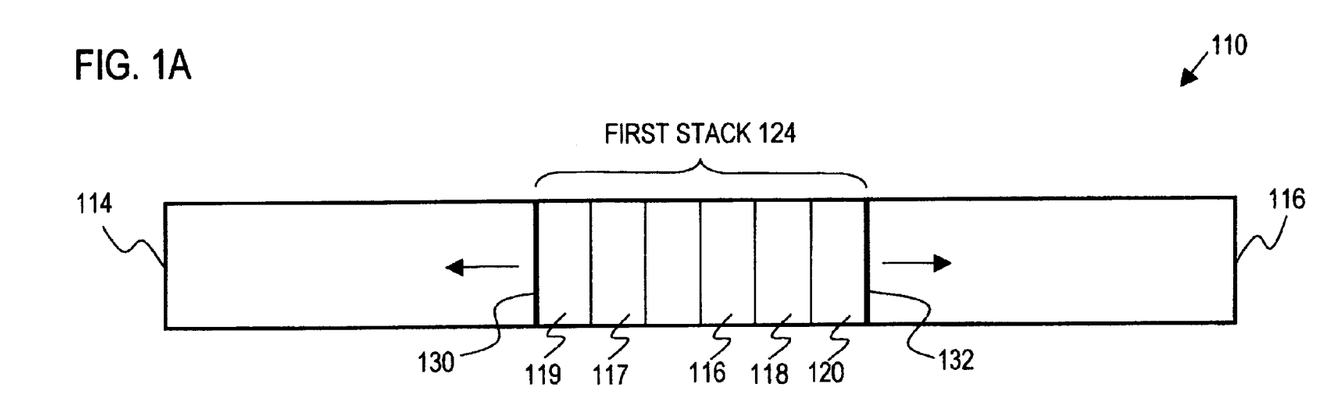
FIGS. 1A through 1D depict a memory storage area, having, respectively, one, two, three and four stacks.

Referring now to FIG. 1A, a storage area 110 is shown for storing data elements. The storage area has a first end 114 and second a second end 116. A first set of data elements 116 through 120 are stored in a first stack 124 in the storage area 110. The first stack has a first end 130 facing the first end 114 of the storage area 110, and a second end 132 facing the second end 116 of the storage area 110.

Figure 1B:
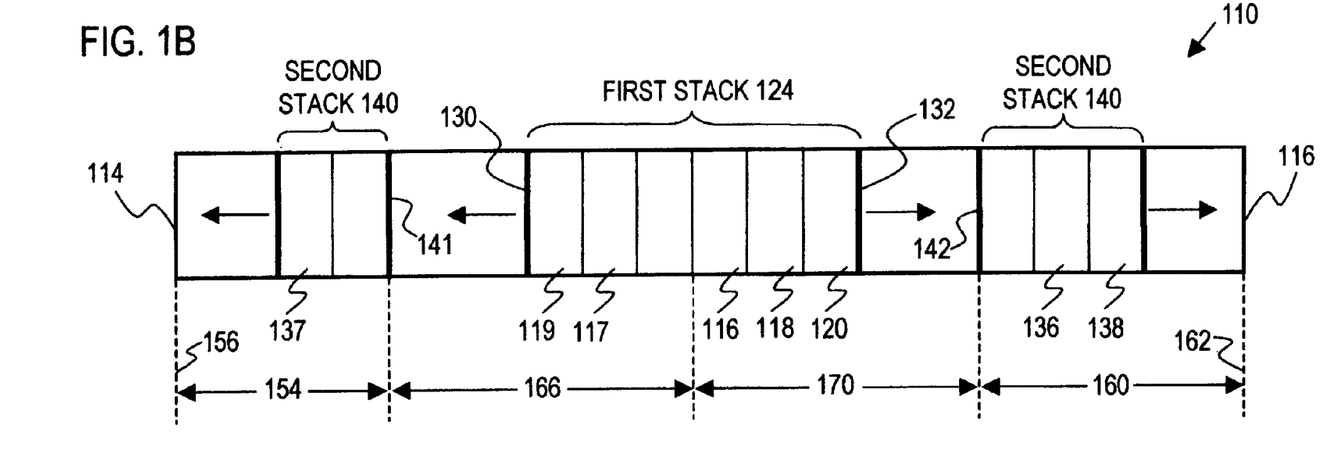

Referring now to FIG. 1B, a second set of data elements 136 through 138 are stored in a second stack 140 in the storage area. Data element 137 is located proximate the first end 130 of the first stack 124 and data elements 136 and 138 located proximate the second end 132 of the first stack 124.

Figure 1C:
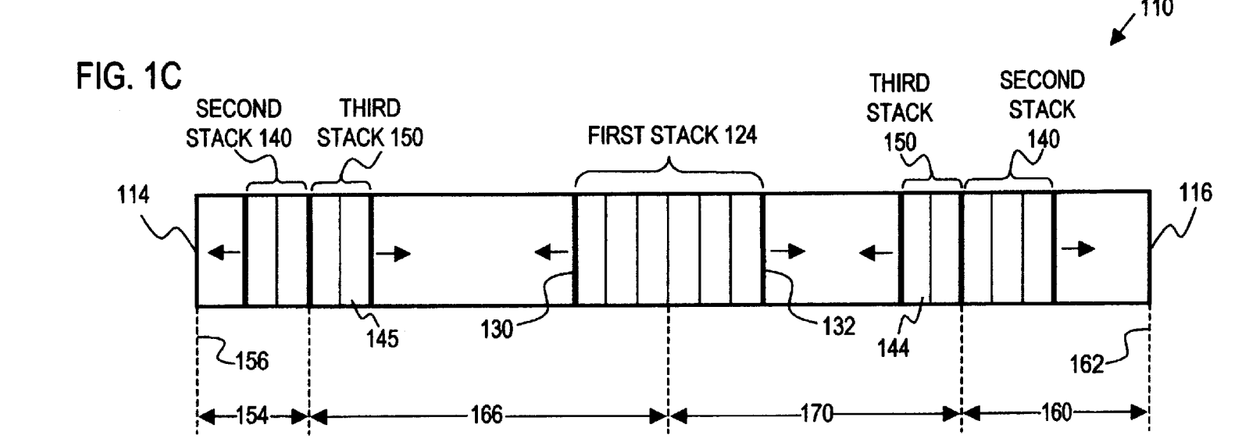

Referring now to FIG. 1C, a third set of data elements 144 and 145 are stored in a third stack 150 in the storage array 110. Data element 145 is located proximate the first end 130 of the first stack 124, and data element 144 located proximate the second end 132 of the first stack 124.

Referring again to FIG. 1B, the storage area 110 has four mutually exclusive sections 154, 160, 166 and 170. Section 154 is an end one of the sections. That is, section 154 has an end 156 at storage area end 114. Sections 160 is another end one of the sections. That is, section 160 has an end 162 at storage area end 116. Sections 166 and 170 are middle ones of the sections. That is, section 166 and 170 are located between the end section 154 and the end section 160. Note that the first stack 124 is confined to the middle sections 166 and 170, and the second stack 140 is confined to the end sections 154 and 160.

Referring again to FIG. 1C, note also that the third stack 150 is confined to the middle sections 166 and 170.

Figure 1D:
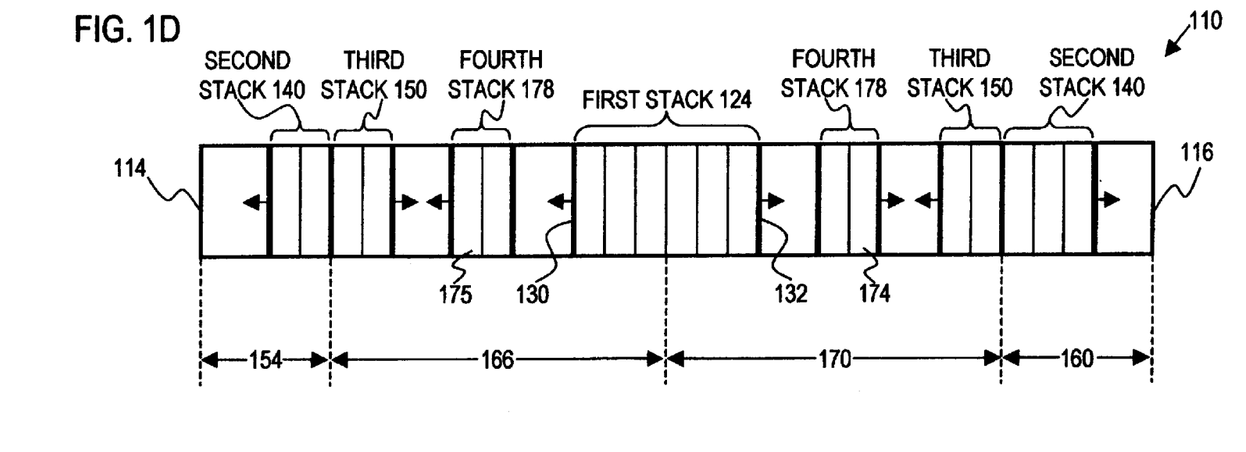

Referring now to FIG. 1D, a fourth set of data elements 174 and 175 are stored in a fourth stack 178 in the storage array 110. Data element 174 is located proximate the first end 130 of the first stack 124, and data element 175 located proximate the second end 132 of the first stack 124. The fourth stack is confined to the middle sections of the storage area, as are stacks 124 and 150.

It notable that each one of the stacks, shown in FIGS. 1A through 1D, increase in size toward both the first end of the storage area and the second end of the storage area, responsive to the storing of successive ones of the data elements in the stack. That is, each of the stacks grows bi-directionally. The increasing in size of the second stack 140 toward the first and second ends of the storage area includes increasing in size away from the first stack 124, i.e., away from the middle of the storage area, while the increasing in size of the third stack 150 includes increasing toward the first stack 124, i.e., toward the middle of the storage area.

Clearly the single stack configuration of FIG. 1A, with the stack 124 in the middle of the storage area 110, and growing bi-directionally, makes more advantageous use of space in the storage area than would a single stack located in the middle and growing in only a single direction, and makes use of the space equally as well as a single stack located at one end and growing in only one direction. Furthermore, note that with the two stack configuration of FIG. 1B, with the stack 124 in the middle, and having a portion of the second stack 140 with the beginning 141 of one portion of the second stack 140 centered in the left half of the storage area, proximate one side 130 of the first stack, and the beginning 142 of the other portion of the second stack 140 centered in the right half of the storage area, on the other side 132 of the first stack, this configuration makes use of space in the storage area equally as well as would two stacks located at the ends of the storage area, each growing in only a single direction, toward the center, and make more advantageous use of the space than would a configuration with one unidirectional stack in the middle and one unidirectional stack at one end.

Generally speaking, if it is assumed that it is not known initially how many stacks will be put in the storage area, and if the first stack added is bi-directional, in accordance with one of the present related applications, then it is advantageous to use additional bi-directional stacks for the next stacks added, and preferable to use split bi-directional stacks as described in the present application if the ultimate number of stacks is an even number. If the first stack added is unidirectional, then for an ultimate even number of stacks it is preferable to use unidirectional stacks or split bi-directional stacks for the remainder of the stacks.

Figure 2A:
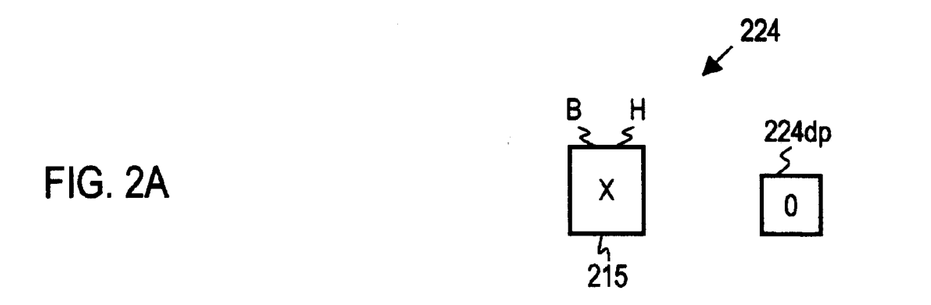
FIGS. 2A through 2E depict a stack which is initially empty of data elements in FIG. 2A, and to which data elements are then added, one by one, in respective FIGS. 2B through 2D, and to which one of the data elements is finally removed, in FIG. 2E.

Referring now to FIG. 2A, a stack 224 is shown. The stack initially has a single, dead element 215. (Element 215 has no data because the embodiment illustrated is a dead element FILO stack.) As shown in FIG. 2A, a direction pointer bit 224*dp* for the stack 224 initially has a value of "0." This value has the effect of pointing to the right, thereby indicating that a next element in the stack 224 will be located to the right of the current element 215. As shown, a base pointer B and a head pointer H both point to element 215 initially, i.e., when there is no data in the stack 224.

Figure 2B:
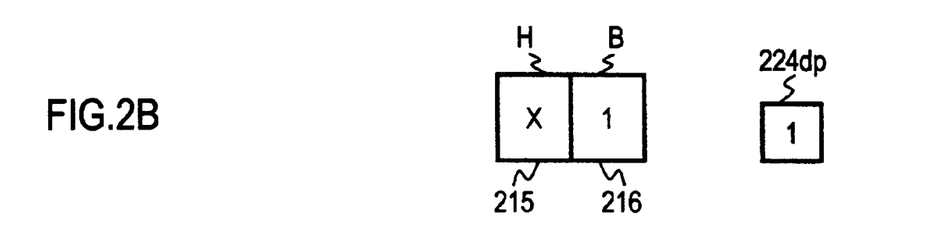

Referring now to FIG. 2B, a data element 216 has been added to the stack 224. The data pointer 224*dp* is now set to a value "1," indicating that a next element in the stack will be added to the left of the current element 216. After the data element has been added, or "pushed," to the stack 224, the base pointer B is pointing, as shown, to element 216, and the head pointer H is pointing, as shown, to element 215. The head pointer H points to element 215 to indicate that the next element will be added adjacent to element 215, i.e., on the left end of the stack 224. The base pointer B points to element 216 to indicate that element 216 is the right end of the stack 224, which corresponds to the current top of the stack.

Figure 2C:
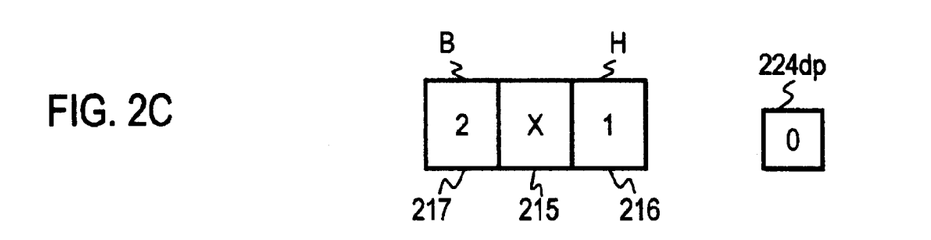

Referring now to FIG. 2C, a second data element 217 has been added to the stack. The data pointer 224*dp* now has a value of "0" to indicate that the next element will be added to the right of element 217, i.e., the right end of the stack 224. The head pointer H has accordingly been moved to element 216, the element on the right end of the stack 224, which is the element adjacent to which the next element will be added. The base pointer B has been moved to element 217, i.e., the new left end of the stack 224.

Figure 2D:
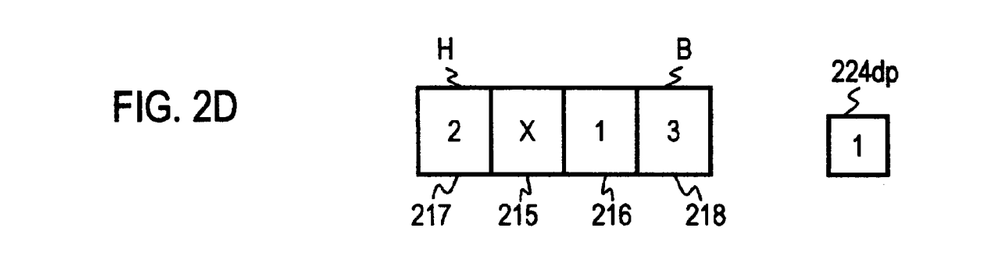

Referring now to FIG. 2D, a third data element 218 has been added. The data pointer 224*dp* now has a value "1" to indicate that the next element will be added at the left end of the stack. Accordingly, the head pointer has been moved to the left end and the base pointer to the right end.

Figure 2E:
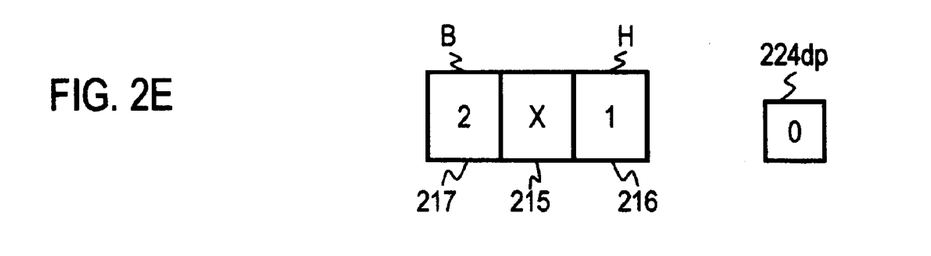

Referring now to FIG. 2E, the last data element that had been added, i.e., third data element 218, has been removed, i.e., "popped," from its location which was formerly the right end of the stack, so the head pointer H has been moved back to element 216 on what is now the right end of the stack, adjacent to which the next element to be added will be pushed.

Figures 3A, 3B:
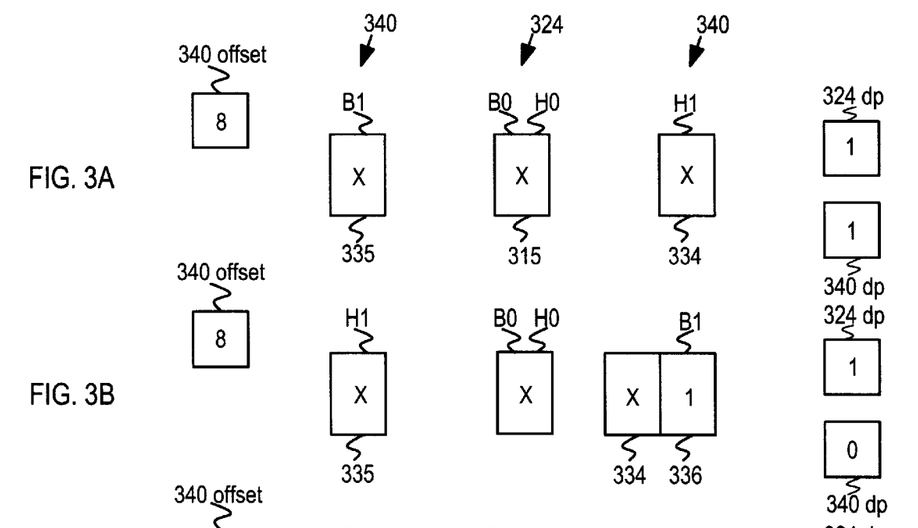
FIGS. 3A through 3E depict two stacks, both of which grow outwardly and one of which is split into two parts, one on each side of the other stack, both of which are initially empty of data elements, in FIG. 3A, and wherein data elements are then added to the split stack, one by one, in respective FIGS. 3B through 3D, and finally removed, in FIG. 3E.
Figures 3C, 3D, 3E:
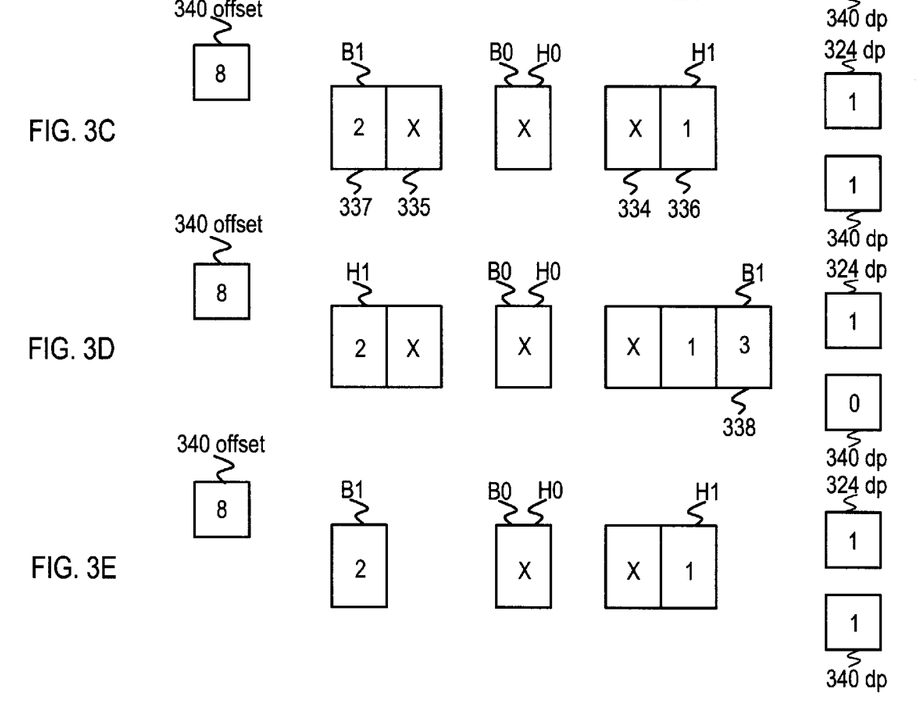

FIGS. 3A through 3E depict two stacks, stack 324 and stack 340. Stack 340 is split into two parts, one proximate each side of stack 324, and grows outwardly. Because it is split in two, stack 340 has two dead elements 334 and 335, as shown. Both of the stacks are initially empty of data elements, as shown in FIG. 3A. Data elements are then added to the split stack, i.e., stack 340, one by one, in respective FIGS. 3B through 3D, and finally removed, in FIG. 3E, just has been done to stack 224 in FIGS. 2B through 2E. Note that the pointers H and B move from one end of the stack 340 to the other end with each successive push or pop, as the pointers do in FIGS. 2B through 2E, and the direction pointer alternates in value with each successive push and pop, just as in FIGS. 2B through 2E.

FIGS. 3A through 3E illustrate that, contrary to what might have been expected, the existence of stack 324 interposed between parts of stack 340 does not complicate the operations of the pointers and the flags of stack 340, as compared to the non-split bi-directional stack shown in FIGS. 2A through 2E. In order to determine when the stack is empty, the split stack does require one more piece of information. That is, the initial offset between the two dead elements, which also corresponds to the initial offset between the base and head pointers, must be saved, so that an empty stack can be detected by comparing the initial offset to a current offset of the base and head pointers. Therefore, in FIGS. 3A through 3E, a datum 340 offset is shown for the stack, indicating the initial base and head pointer offset.

FIGS. 7A through 7E depict two stacks, stack 724 and stack 740. Stack 740 is split into two parts, one proximate each side of stack 724, like stacks 324 and 340 in FIGS. 3A through 3E, but stack 740 grows inwardly, unlike stack 340. Data elements are then added to the split stack, i.e., stack 740, one by one, in respective FIGS. 7B through 7D, and finally removed, in FIG. 7E, just has been illustrated previously. Note that, just as in the previously illustrated cases, the pointers H and B move from one end of the stack 340 to the other end with each successive push or pop, and the direction pointer alternates in value with each successive push and pop, however the direction pointer begins with a value of "0," if the stack is to initially grow from the rightward portion inwardly.

Figure 4:
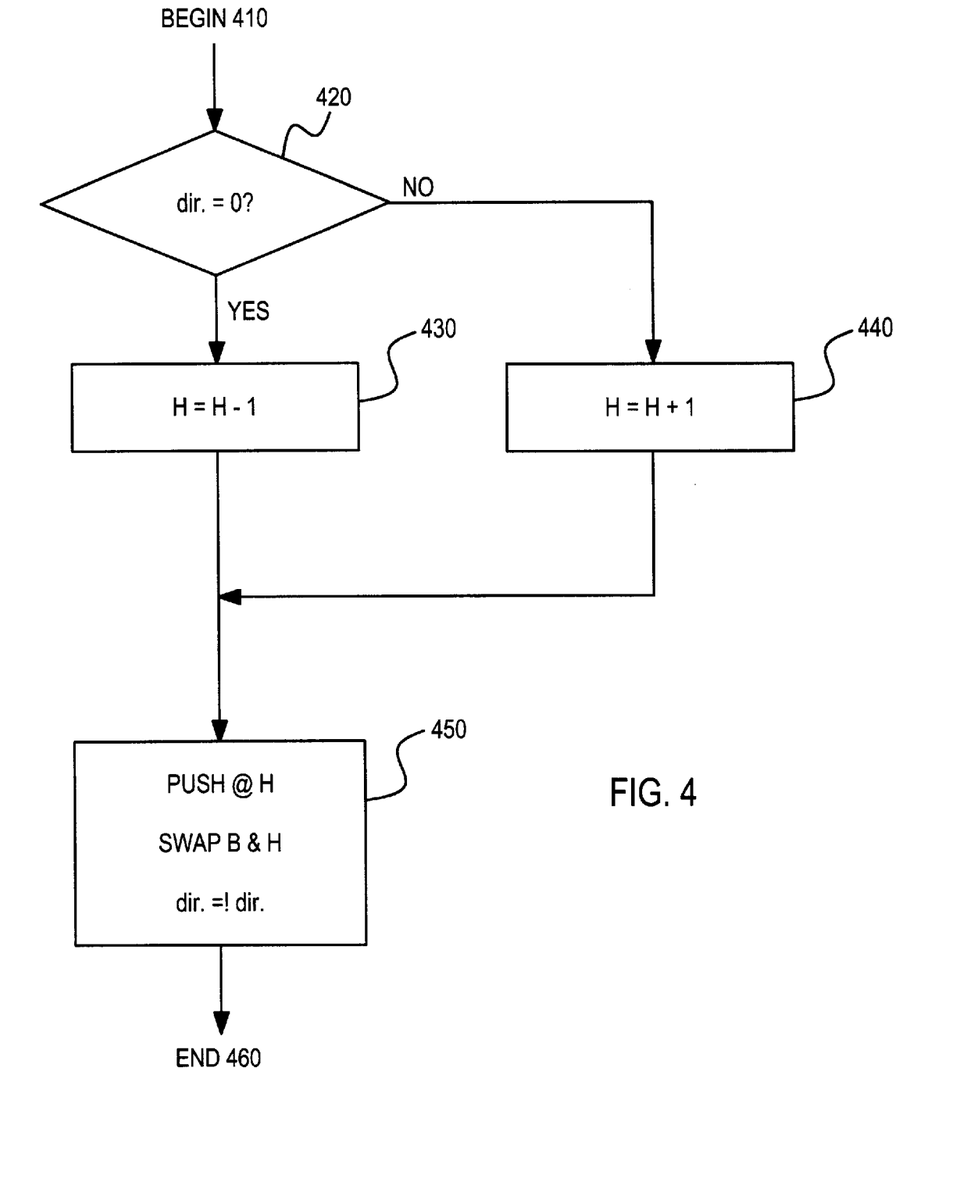
FIG. 4 illustrates, in a flow chart, an operation to push a data element into a bi-directional stack.

FIG. 4 illustrates, in a flow chart, an operation to push a data element into a bi-directional stack. At 410 the algorithm for adding a data element to the stack begins. The direction pointer is first inspected at 420. If the direction equals 0, then the head pointer is decremented by 1 at 430, which moves the pointer one element to the left in the storage area. If the direction is not equal 0, i.e., if the direction pointer=1, then the head pointer is incremented by 1 at 440, which moves the pointer one element to the right in the storage area. Then, once the head pointer has been appropriately repositioned, the data is added, i.e., pushed, at the new location pointed to by the head pointer, as indicated at 450. Also, as indicated at 450, after the data is pushed, the locations to which the head and base pointers point are exchanged, and the new value for the direction pointer is set to the inverse of the previous value. The algorithm ends at 460.

Figure 6:
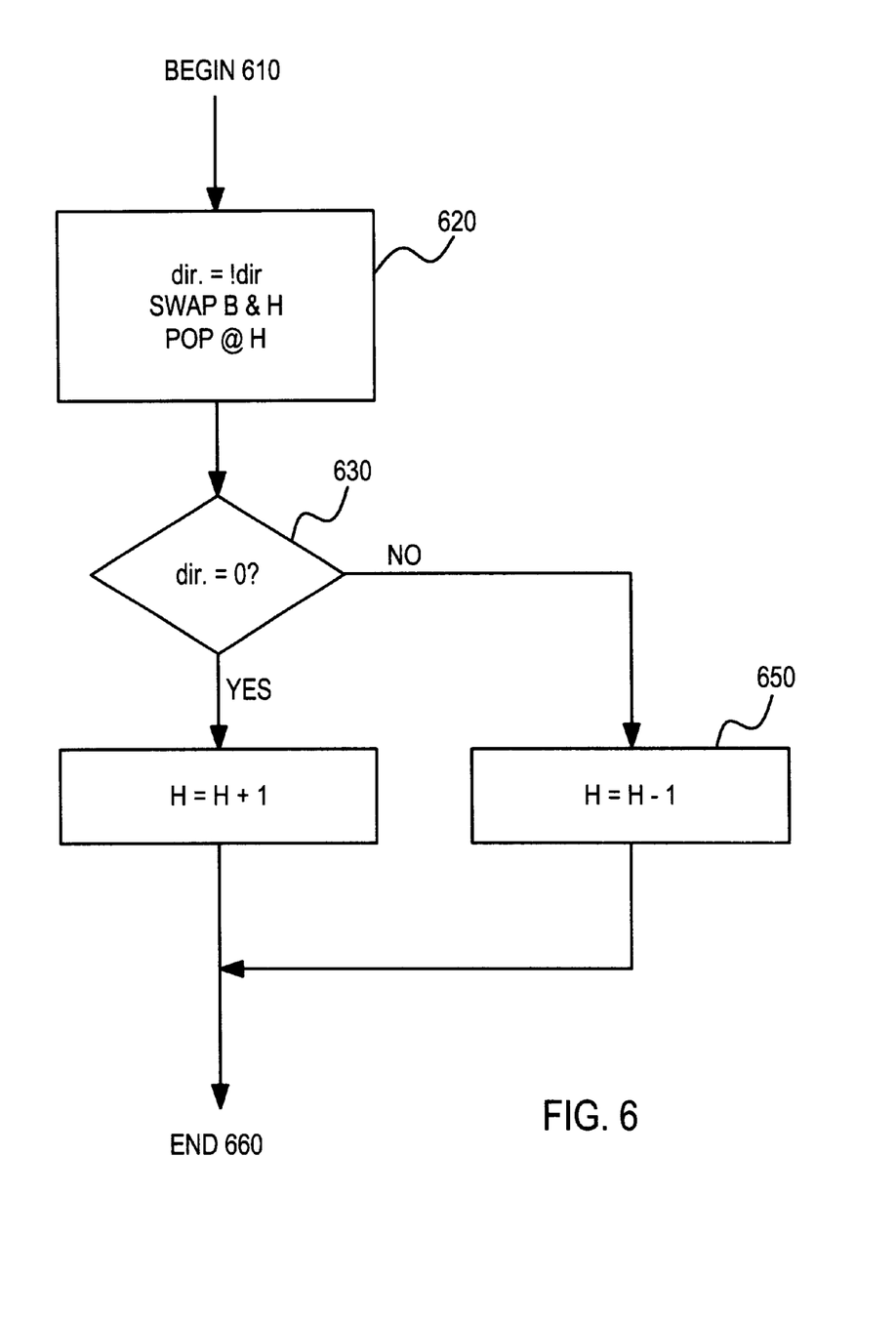
FIG. 6 illustrates, in a flow chart, an operation to pop a data element out of a bi-directional stack.
Figure 7A:
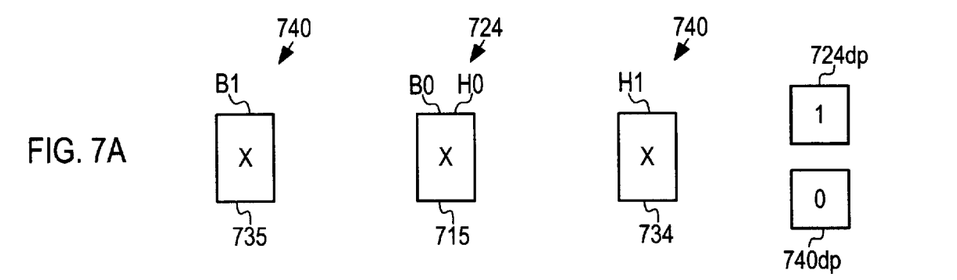
FIGS. 7A through 7E depict two stacks, one of which grows outwardly and one of which is split into two parts, one proximate each side of the other stack, and grows inwardly, both of which are initially empty of data elements, in FIG. 3A, and wherein data elements are then added to the split stack, one by one, in respective FIGS. 3B through 3D, and finally removed, in FIG. 3E.
Figure 7B:
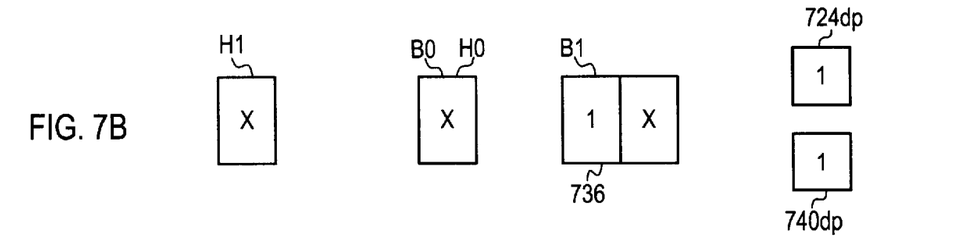
Figure 7C:
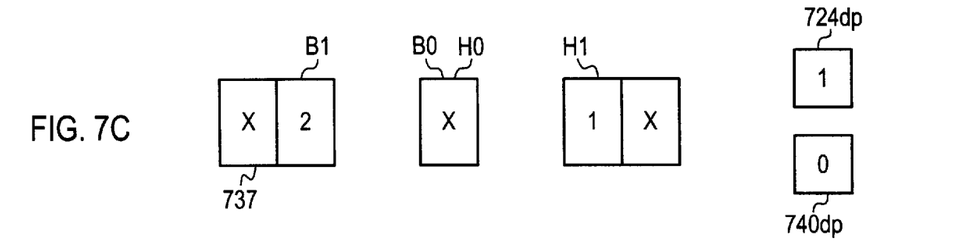
Figure 7D:
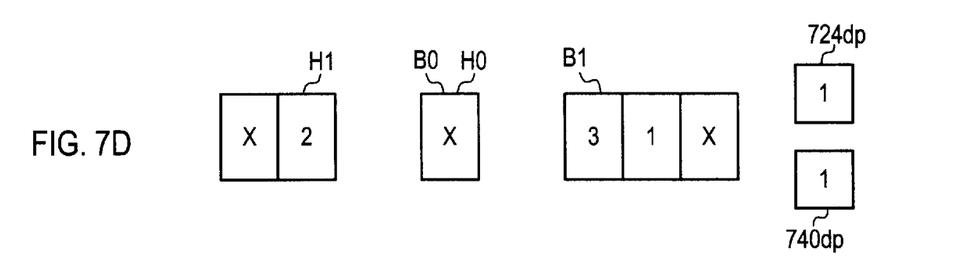
Figure 7E:
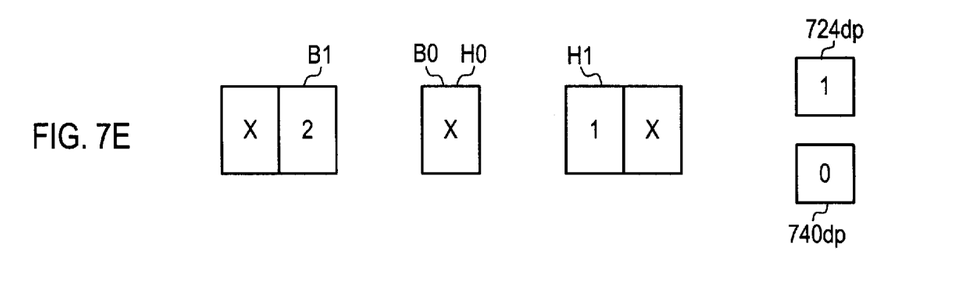

FIG. 6 illustrates, in a flow chart, an operation to pop a data element out of a bi-directional stack. The algorithm begins at 610. As indicated at 620, the direction pointer is inverted, locations to which the head and base pointers point are exchanged, and then the data is popped from the location pointed to by the head pointer. Next, at 630, the direction pointer is tested. If the direction equals 0, then the head pointer is incremented by 1, at 640, which moves the head pointer to the right. If the direction equals 1, then the head pointer is decremented by 1, at 650, which moves the head pointer to the left. Next, the algorithm ends at 660.

Figure 5:
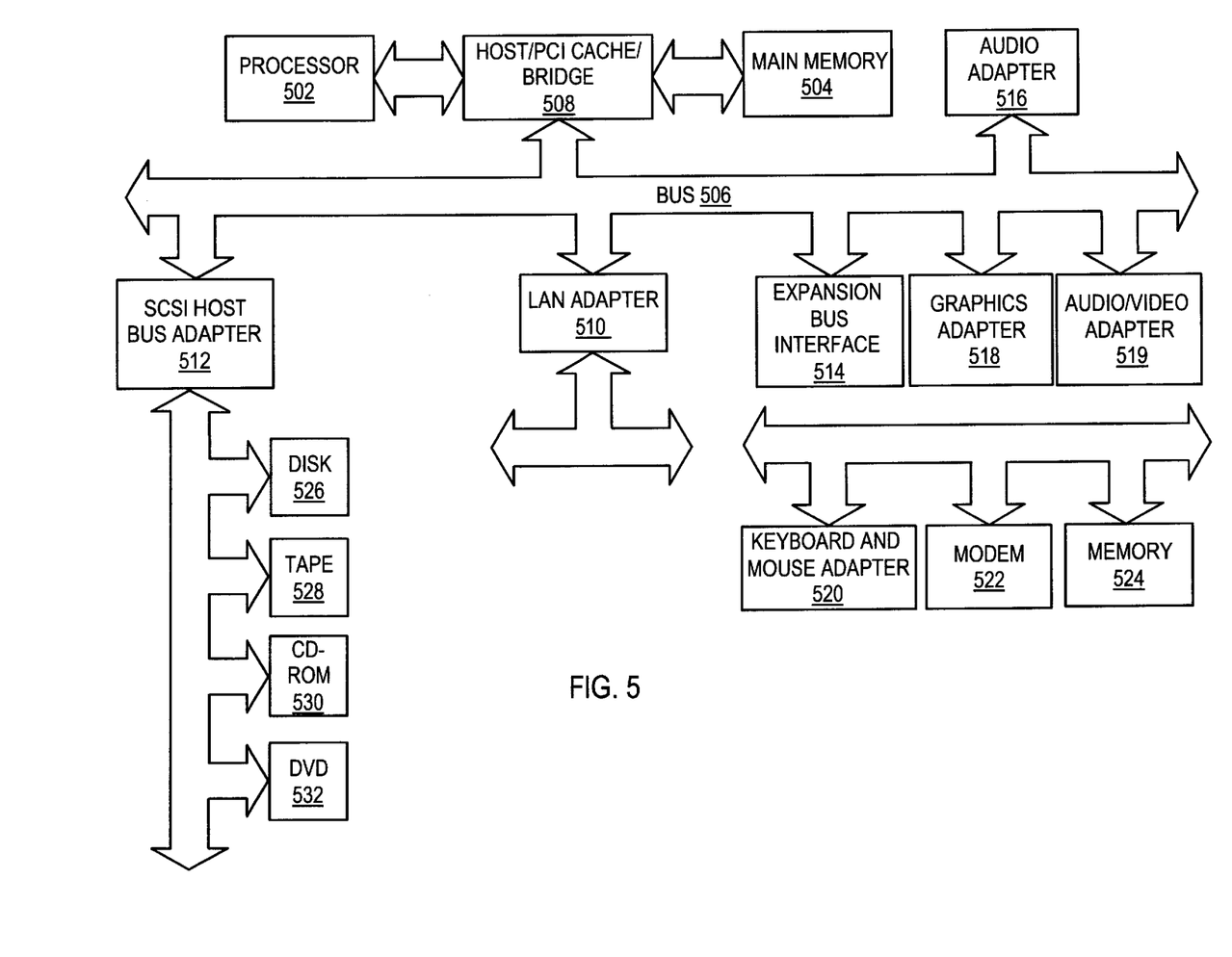
FIG. 5 illustrates, in block diagram form, an exemplary system for implementing the invention.

With reference now to FIG. 5, a block diagram of a data processing system in which the present invention may be implemented is illustrated. Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

Although the present invention has been described primarily with reference to modifications necessary to change a uni-directionally growing dead element stack into a bi-directionally growing dead element stack, ones skilled in the art will recognize that the present invention may be applied to create other types of bi-directionally growing stacks. For example, the present invention may be applied to create a bi-directionally growing used element stack rather than a dead element stack. In a used element stack, the memory location that both the head and base pointer point to prior to beginning the stack is used to store an element. However, in a dead element (or empty element) stack, as described above, the memory location in which both the head pointer and base pointer originate before the stack begins, is not used to store an element. Other types of stacks may be modified as well to create bi-directionally growing stacks. Thus, the present invention is not limited to dead element stacks.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing storage of data elements comprising the steps of:

providing a storage area for storing data elements, the storage area having a first and second end;

storing a first set of data elements in a first stack in the storage area, wherein the first stack has a first end facing the first end of the storage area and a second end facing the second end of the storage area; and storing a second set of data elements in a second stack in the storage area, wherein the second stack functions as a single stack and is split, wherein the second stack includes at least one data element located between the first end of the first stack and a corresponding first end of the storage area, and at least one data element located between the second end of the first stack and a corresponding second end of the storage area.

2. The method of claim 1 comprising the step of storing a third set of data elements in a third stack in the storage array, wherein the third stack includes at least one data element located between the first end of the first stack and a corresponding first end of the storage area, and at least one data element located between the second end of the first stack and a corresponding second end of the storage area.

3. The method of claim 1, the storage area having four mutually exclusive sections, as follows: i) a first one of the sections being an end one of the sections, wherein the first section has an end coincident with one of the storage area ends, ii) a second one of the sections being another end one of the sections, wherein the second section has an end coincident with a second one of the storage area ends, and iii) third and fourth ones of the sections being middle ones of the sections, wherein the third and fourth sections are located between the first and second sections; and wherein the method comprises the step of confining the first stack to the middle ones of the sections and the second stack to the end ones of the sections.

4. The method of claim 3 comprising the steps of:

storing a third set of data elements in a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area; and confining the third stack to the middle ones of the sections.

5. The method of claim 1, wherein such a stack increases in size toward both the first end of the storage area and the second end of the storage area, responsive to the storing of successive ones of the data elements in the stack.

6. The method of claim 5, wherein the increasing in size of the second stack toward the first and second ends of the storage area includes increasing in size away from the first stack.

7. The method of claim 6 comprising the step of storing a third set of data elements in a third stack in the storage array;

wherein the third stack functions as a single stack and is split, and wherein the third stack includes a first data element located between the first end of the first stack and a corresponding first end of the storage area and a second data element located between the second end of the first stack and a corresponding second end of the storage area;

wherein the third stack increases in size toward both the first end of the storage area and the second end of the storage area, responsive to the storing of successive ones of the data elements in the stack; and wherein the increasing in size of the third stack toward the first and second ends of the storage area includes increasing in size toward the first stack.

8. The method of claim 5, wherein the increasing in size of the second stack toward the first and second ends of the storage area includes increasing in size toward the first stack.

9. The method of claim 8 comprising the step of storing a third set of data elements in a third stack in the storage array;

wherein the third stack functions as a single stack and is split, and wherein the third stack includes a first data element located between the first end of the first stack and a corresponding first end of the storage area and a second data element located between the second end of the first stack and a corresponding second end of the storage area;

wherein the third stack increases in size toward both the first end of the storage area and the second end of the storage area, responsive to the storing of successive ones of the data elements in the stack; and wherein the increasing in size of the third stack toward the first and second ends of the storage area includes increasing in size away from the first stack.

10. A computer program product in a computer readable media for use in a data processing system for managing storage of data elements, the computer program product comprising:

first instructions for storing data elements in a first stack in a storage area, wherein the first stack has a first end facing a first end of the storage area, and a second end facing a second end of the storage area; and second instructions for storing data elements in a second stack in the storage array, wherein the second stack data functions as a single stack and is split, wherein the second stack includes at least one data element located between the first end of the first stack and a corresponding first end of the storage area, and at least one data element located between the second end of the first stack and a corresponding second end of the storage area.

11. The computer program product of claim 10 comprising third instructions for storing data elements in a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area.

12. The computer program product of claim 10, the storage area having four mutually exclusive sections, as follows: i) a first one of the sections being an end one of the sections, wherein the first section has an end coincident with one of the storage area ends, ii) a second one of the sections being another end one of the sections, wherein the second section has an end coincident with a second one of the storage area ends, and iii) third and fourth ones of the sections being middle ones of the sections, wherein the third and fourth sections are located between the first and second sections; and wherein the second instructions include instructions for confining the first stack to the middle ones of the sections, and the third instructions include instructions for confining the second stack to the end ones of the sections.

13. The computer program product of claim 12 comprising:

third instructions for storing data elements in a third stack in the storage array, wherein the third stack data functions as a single stack and is split, and wherein the third stack includes a first data element located between the first end of the first stack and a corresponding first end of the storage area and a second data element located between the second end of the first stack and a corresponding second end of the storage area, and wherein the third stack is confined to the middle ones of the sections.

14. The computer program product of claim 10, wherein such a stack increases in size toward both the first end of the storage area and the second end of the storage area, responsive to the storing of successive ones of the data elements in the stack.

15. The computer program product of claim 14, wherein the increasing in size of the second stack toward the first and second ends of the storage area includes increasing in size away from the first stack.

16. The computer program product of claim 15 comprising third instructions for storing data elements in a third stack in the storage array, wherein the third stack data functions as a single stack and is split, and wherein the third stack includes a first data element located between the first end of the first stack and a corresponding first end of the storage area and a second data element located between the second end of the first stack and a corresponding second end of the storage area, wherein the third stack increases in size toward both the first end of the storage area and the second end of the storage area, responsive to the storing of successive ones of the data elements in the stack, and wherein the increasing in size of the third stack toward the first and second ends of the storage area includes an increasing in size toward the first stack.

17. The computer program product of claim 14, wherein the increasing in size of the second stack toward the first and second ends of the storage area includes increasing in size toward the first stack.

18. The computer program product of claim 17, comprising third instructions for storing data elements in a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area, wherein the third stack increases in size toward both the first end of the storage area and the second end of the storage area, responsive to the storing of successive ones of the data elements in the stack, and wherein the increasing in size of the third stack toward the first and second ends of the storage area includes increasing in size away from the first stack.

19. A system for managing storage of data elements, comprising:

means for defining a storage area for storing data elements, the storage area having a first and second end;

means for defining a first stack in the storage array, wherein the first stack has a first end facing the first end of the storage area and a second end facing the second end of the storage area; and means for defining a second stack in the storage array, wherein the second stack functions as a single stack and is split, and wherein the second stack includes a first data element located between the first end of the first stack and a corresponding first end of the storage area and a second data element located between the second end of the first stack and a corresponding second end of the storage area.

20. The system of claim 19 comprising means for defining a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area.

21. The system of claim 19, the storage area having four mutually exclusive sections, as follows: i) a first one of the sections being an end one of the sections, wherein the first section has an end coincident with one of the storage area ends, ii) a second one of the sections being another end one of the sections, wherein the second section has an end coincident with a second one of the storage area ends, and iii) third and fourth ones of the sections being middle ones of the sections wherein the third and fourth sections are located between the first and second sections; and wherein the means for defining the first stack in the storage array includes means for confining the first stack to the middle ones of the sections, and the means for defining the second stack in the storage array includes means for confining the second stack to the end ones of the sections.

22. The system of claim 21 comprising:

means for defining a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area, and wherein the third stack is confined to the middle ones of the sections.

23. The system of claim 19, wherein such a stack increases in size toward both the first end of the storage area and the second end of the storage area, responsive to storing successive ones of the data elements in the stack.

24. The system of claim 23, wherein the increasing in size of the second stack toward the first and second ends of the storage area includes increasing in size away from the first stack.

25. The system of claim 24 comprising means for defining a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area, and wherein the increasing in size of the third stack toward the first and second ends of the storage area includes an increasing in size toward the first stack.

26. The system of claim 23, wherein the increasing in size of the second stack toward the first and second ends of the storage area includes increasing in size toward the first stack.

27. The system of claim 26, comprising fourth instructions for defining a third stack in the storage array, wherein the third stack functions as a single stack and is split, and wherein the third stack includes a first data element located between the first end of the first stack and a corresponding first end of the storage area and a second data element located between the second end of the first stack and a corresponding second end of the storage area, wherein the third stack increases in size toward both the first end of the storage area and the second end of the storage area, responsive to storing of successive ones of the data elements in the third stack, and wherein the increasing in size of the third stack toward the first and second ends of the storage area includes increasing in size away from the first stack.

* * * * *